US010545962B2

(12) United States Patent
Collins et al.

(10) Patent No.: US 10,545,962 B2
(45) Date of Patent: Jan. 28, 2020

(54) RELATIONAL DATABASE INSTRUCTION VALIDATION

(71) Applicant: salesforce.com, inc., San Francisco, CA (US)

(72) Inventors: Jesse Collins, Oakland, CA (US); Xuerong Tang, San Francisco, CA (US); Scott Hansma, Burlingame, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 176 days.

(21) Appl. No.: 15/415,186

(22) Filed: Jan. 25, 2017

(65) Prior Publication Data

US 2018/0210909 A1     Jul. 26, 2018

(51) Int. Cl.
    *G06F 7/00*      (2006.01)
    *G06F 17/30*     (2006.01)
    *G06F 16/2455*   (2019.01)
    *G06F 16/28*     (2019.01)

(52) U.S. Cl.
    CPC ........ *G06F 16/2456* (2019.01); *G06F 16/284* (2019.01)

(58) Field of Classification Search
    CPC ......... G06F 17/30371; G06F 17/30339; G06F 17/30498; G06F 16/2456; G06F 16/284
    USPC ............. 707/690, 999.02, 999.005, 694, 698
    See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |

(Continued)

*Primary Examiner* — Md I Uddin
(74) *Attorney, Agent, or Firm* — Schwabe, Williamson & Wyatt

(57) ABSTRACT

In an example, a database system may be configured to validate relational database instructions using a plurality of validators. In some examples, validation may be pre-production for relational database instructions based on simulated user inputs and/or file, such as plan files (e.g., PL/SQL (procedural language/structured query language) files). In some examples, validation may be in production for relational database instructions based on system views of a database engine.

20 Claims, 8 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,615,203 B1* | 9/2003 | Lin .................. G06F 16/24542 |
| 6,615,222 B2 | 9/2003 | Hornbrook |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,272,589 B1 | 9/2007 | Guay |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,155 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,653,665 B1 | 1/2010 | Stefani |
| 7,668,861 B2 | 2/2010 | Steven |
| 7,698,160 B2 | 4/2010 | Beaven et al. |
| 7,730,178 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,846,723 B1 | 12/2017 | Fitzpatrick |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0093415 A1 | 5/2003 | Larson |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187864 A1 | 10/2003 | McGoveran |
| 2003/0187921 A1 | 10/2003 | Dice et al. |
| 2003/0189600 A1 | 10/2003 | Gune et al. |
| 2003/0191774 A1 | 10/2003 | Slutz |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0243613 A1 | 12/2004 | Pourheidari |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0039033 A1 | 2/2005 | Meyers |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | |
|---|---|---|
| 2009/0265324 A1* | 10/2009 | Mordvinov .......... G06F 16/245 |
| 2010/0191720 A1 | 7/2010 | Al-Omari |
| 2011/0218958 A1 | 9/2011 | Warshavsky |
| 2011/0247051 A1 | 10/2011 | Bulumulla |
| 2011/0282847 A1 | 11/2011 | Collins |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0067440 A1 | 3/2013 | Tendulkar |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0208291 A1 | 7/2014 | Agovic |
| 2014/0359537 A1 | 12/2014 | Jackobson et al. |
| 2015/0261507 A1 | 9/2015 | Bhagavan |
| 2015/0278275 A1 | 10/2015 | Kumar |
| 2016/0306709 A1 | 10/2016 | Shaull |
| 2016/0335318 A1 | 11/2016 | Gerweck |
| 2017/0140000 A1 | 5/2017 | Mielenhausen |
| 2017/0364553 A1 | 12/2017 | Jacob |

\* cited by examiner

RELATIONAL DATABASE INSTRUCTION VALIDATION

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to databases, and some embodiments relate to relational database instruction validation.

DESCRIPTION OF THE RELATED ART

SQL (structured query language) is a programming language to manage data of a relational database. Some relational databases may include more than one table populated with data.

A relational database instruction (e.g., a SQL statement, an SQL query, or the like, or combinations thereof) may cause the relational database to perform selected table operations for selected tables. Depending on the combination of table operations and/or tables involved with a given relational database instruction, the given relational database instruction may require minimal to significant database system resources (e.g., processing resources) for responding to the instruction. Some known relational database schemes may rely on access limitations to relational database access as a partial solution to attempt to prevent database system resources from being over utilized.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
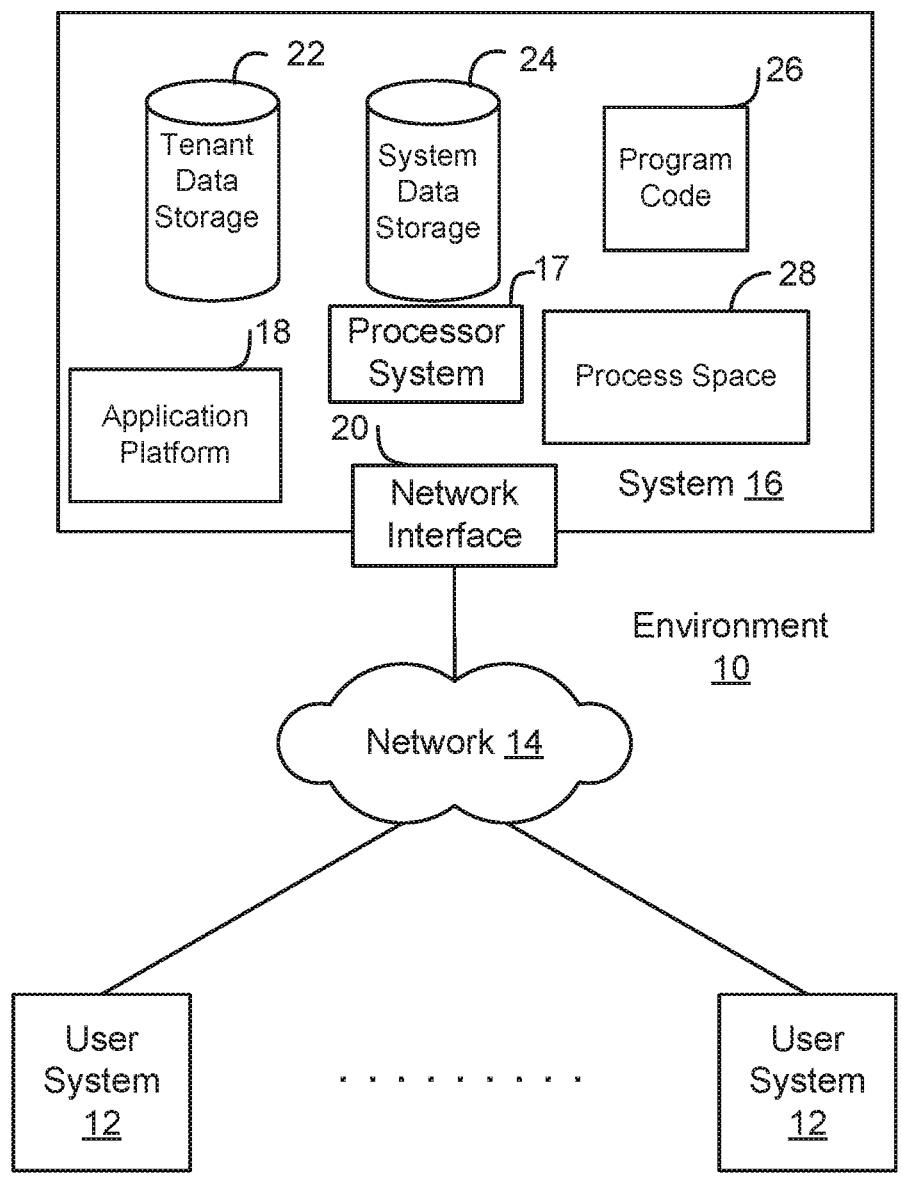
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for relational database instruction validation.

In some examples, a database system includes a module to identify relational database instruction (e.g., SQL (structured query language) code) responsive to receipt of a user request, e.g., a customer request (in some database systems, the module may be part of an application server). The module may call a block of SQL code predefined in an SQL script responsive to the user input and/or generate SQL text dynamically. The identified relational database instruction may be passed to a database engine of the database system. However, the identified relational database instruction may include code that may require significant resources of the database engine because of the type of table operation(s) included in the instruction and/or attributes of the tables associated with operation(s) of the instruction. In some examples, the database system includes a validation module to receive a relational database instruction as an input and to output validation indication(s) responsive to the input.

In some examples, the validation module may include one or more parser-based validators. Some parser-based validators may be configured to parse SQL text into a parse tree and identify elements, e.g., predefined elements, in the parse tree such as tables, columns in filters, columns in join conditions, hints, or the like, or combinations thereof. These parser-based validators may be configured to use a rule-based validation checking responsive to identification of the elements. In some examples, the rule based validation may be to meet requirements of the database system (e.g., requirements of the database engine and/or the application server), and may include leading index checking, index hint checking, table hint checking, or the like, or combinations thereof.

In some examples, the validation module may include one or more plan validators, such as ExplainPlan-based validators. Some plan validators may be to exchange communications with the database engine to obtain an explain plan of the input relational database instruction as a plan tree structure. The plan validators may identify nodes in the plan tree structure based on predefined table operations such as FullScan, FullIndexScan, NestedLoopJoin, HashJoin, or the like, or combinations thereof. Some plan validators may include a tree transformer module to parse the relational database instruction into a parse tree to extract information such as filter columns, join columns, table names, table alias, or the like, or combinations thereof, in order to identify the nodes.

The plan validators may be configured to validate the identified relational database instruction based on the identified nodes according to a rule-based approach. For instance, the validation may check whether predefined table operations, such as FullScan and/or FullIndexScan, are used with an underlying table larger than a predefined threshold (and output an identification of an error and/or performance issue if so). The validation may check whether predefined table operations, such as NestedLoop, are associated with a valid index for the columns that are participating in the joins (and output an identification of an error and/or performance issue if not). The validation check may check whether a predefined table operation, such as HashJoin with users or owners table, includes a valid filter (and output an identification of an error and/or performance issue if not). The validation may check whether a predefined table operation, e.g., SemiJoin and/or AntiJoin, is consistent between the plan tree node and the join hint given in the relational database instruction (and output an identification of an error and/or performance issue if not). If the join hint indicates one of Semijoin or Antijoin in an SQL statement, but the validator identifies an indication of the other of the Semijoin or Antijoin in the plan tree, then the validator may output an indication of the inconsistency (e.g., an error, performance issue, or the like, or combinations thereof).

The validation module may be configured to output an indication when an error and/or performance issue is detected based on the validation. In some examples, the validation module or another module may automatically file a bug report with detailed reasoning about the error and/or performance issue, which may be used by developers to, for instance, modify the module to identify a relational database instruction of the application server.

In some examples, the database system may obtain a candidate relational database instruction to be input into the validation module using one or more modules. In some examples, the aforementioned module to identify relational database instruction(s) responsive to a user input (hereinafter a "relational database instruction identification module") may be used to obtain the candidate relational database instruction. In particular, a module of the database system may generate a simulated user input and feed the simulated user input into the relational database instruction identification module to obtain a candidate relational database instruction to be input into the validation module.

In some examples, the database system may include a transformation module, e.g., an Oracle parser, to extract a candidate relational database instruction from a plan file (e.g., a PL/SQL file). The transformation module may output transformation information that is usable by the plan validators to obtain the explain plan for the relational database instruction (in some examples, an explain plan may be obtainable for only about 1% or less of relational database instruction without the transformation information, and as such the transformation module be used with some types of the plan validators (such as a join-type plan validator)). In some examples, the transformation module may implement a tree transformer on the parse trees to identify tables and columns associated with the filters and joins. The plan validators (e.g., a NestedLoop plan validator, a HashJoin validator, a SemiJoin validator, an AntiJoin validator, or the like, or combinations thereof) may utilize a portion of the transformation information that is based on the identified tables and columns for validation.

An output of the validation module for the candidate relational database instruction obtained responsive to inputting the simulated user input into the relational database instruction identification module and/or the transformation module may prevent a relational database instruction based on actual user inputs from reaching the database engine (and avoiding the associated performance impact). This may enable the developers to create different plan files and/or modify the relational database instruction identification module, and release the different plan files and/or modified relational database instruction identification module to production (e.g., for customer use).

Besides validating relational database instructions in an "offline" scenario (for instance validating originating candidate relational database instructions from simulated user inputs or plan files), some examples may utilize some of the aforementioned modules for relational database instruction validation "in production". The database system may include a production run module to obtain relational database instructions based on actual user inputs (e.g., provided by the relational database instruction identification modules responsive to customer inputs/requests). In some examples, the production run module may run a background check at scheduled intervals; say periodic intervals, to check relational database instructions running through the database engine. In particular, the production run module may obtain relational database instructions based on system views collected at the scheduled intervals.

The production run module may select validators of the validation module (e.g., all of the validators or a subset of the validators) for a given obtained relational database instruction, and provide that instruction to the selected validators. In some examples, the production run module may input all non-duplicate relational database instructions into a subset of the validators, such as the syntax validators. The production run module may input non-duplicate relational database instructions into another subset of the validators, such as one or more of the plan validators, conditionally. For example, in some embodiments the production run module may utilize the plan validators at ones of the intervals that correspond to off-peak operation of the database engine (when less customer input/requests to, for instance the database engine, are expected).

The production run module may include a logging and/or monitoring module to send information to another database system module such as splunk and/or an optimizer metrics store for future analysis. In some examples, an automated analysis associated with splunk and/or the optimizer metrics store may identify access to the database system by non-authorized users, thus allowing the non-authorized access to be addressed to stop an attack and/or restore database engine performance. In some examples, a developer may utilize information obtained by the production run module to create new plan files and/or to modify the relational database instruction identification module to optimize database engine operation/performance.

To summarize, some of the database systems described above can generate information that may be used (by developers or automatically by a module of the database system) to modify plan files and/or an application server (e.g., a relational database instruction identification module of the application server) so that performance of the database system is optimized prior to production. In production, some of the database systems described above may determine whether to run a validation at a scheduled time. At these validations, information may be generated that may be used (by developers or automatically by a module of the database system) to detect unauthorized access to the database system and/or may be used to detect performance issues before those performance issues impact users of the database system (such as before the performance issues are noticed by customers).

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser. Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
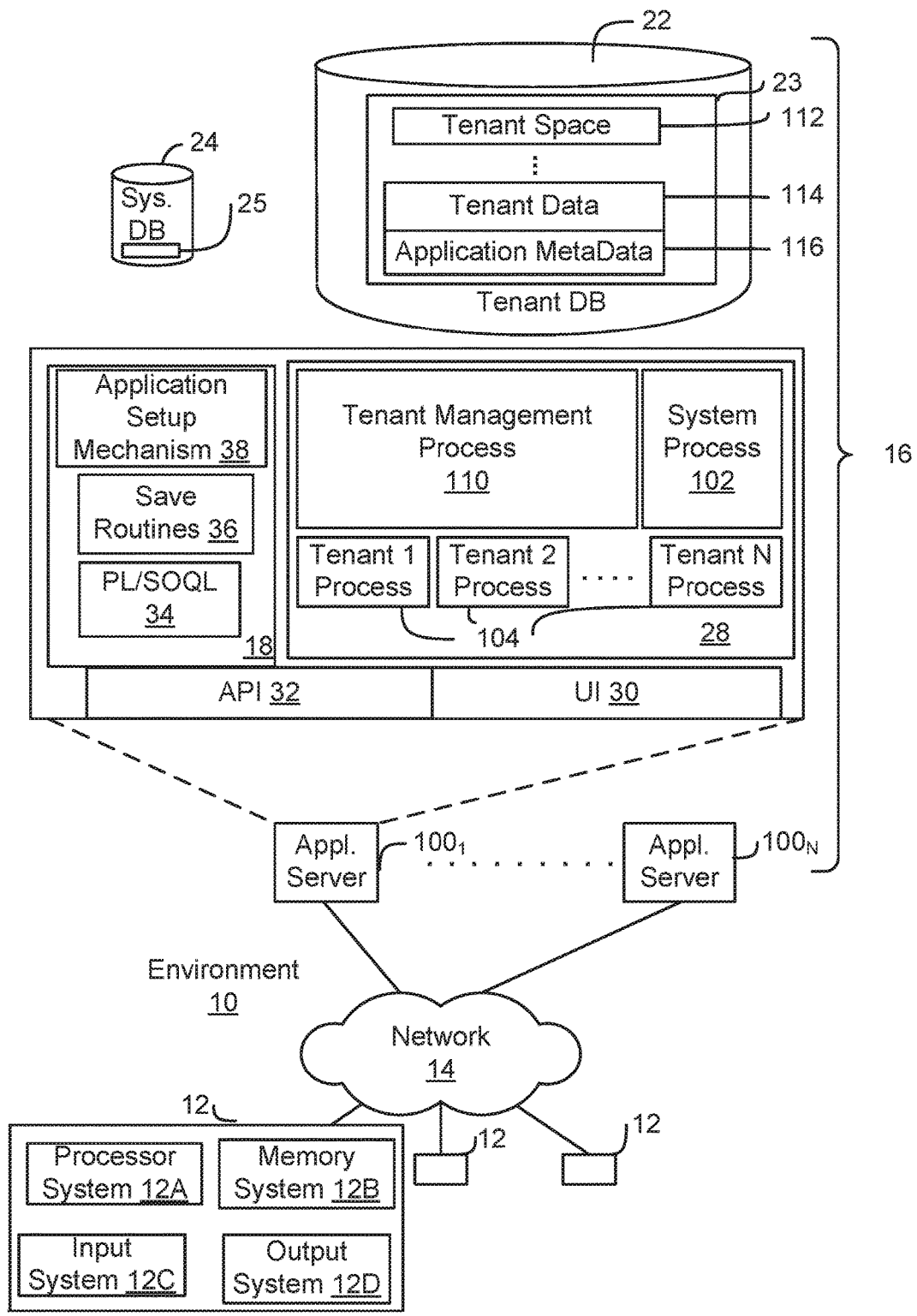
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG.

1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Identifying Relational Database Instructions for Validation

Figure 2:
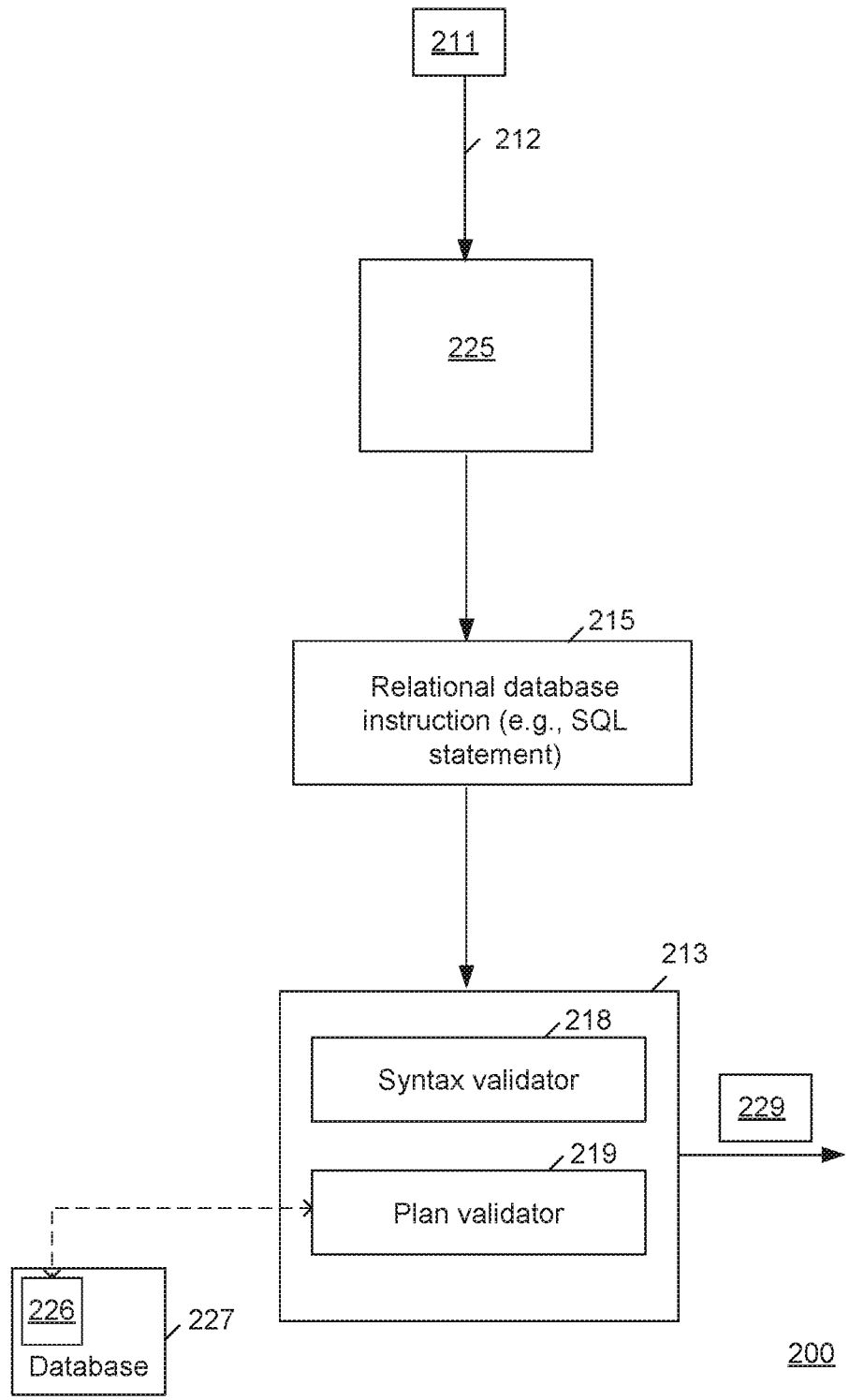
FIG. 2 illustrates a database system for relational database instruction validation.

FIG. 2 illustrates a database system 200 for relational database instruction validation. The database system 200 may include a validation module 213 including one or more validators such as one or more syntax validators 218 and one or more plan validators 219 to generate validation indications 229 responsive to receipt of relational database instructions. The database system 200 may include a relational database 227, which may be similar to the tenant database 22 (FIG. 1B). The validation indications 229 may be electronically transmitted to another module (not shown) and/or stored in an electronic device (not shown) for analysis by, for instance, developers.

In some examples, the database system 200 includes a relational database instruction identification module 225, which may be a component to operate on the application server $100_{1-N}$ (FIG. 1B) to control operation of the relational database 227. The module 225 may be configured to, in production, receive information from user systems 12 (FIG. 1B) based on user inputs and to identify relational database instructions responsive to receiving such information in production. However, the database system 200 may include a simulated input generation module 211 to feed a simulated user input 212 into the module 225 to obtain a candidate relational database instruction 215 for validation. Validation indications 229 based on these simulations may be utilized to modify the module 225 prior to production, e.g., before actual inputs are received from the user systems 12 (FIG. 1B).

In some examples, the syntax validator(s) 218 may apply rules of a database (not shown, such as database system database 24 of FIG. 1B) to validate a given relational database instruction. In some examples, the plan validator(s) 219 of the validation module 213 may communicate with a database engine 226 of the relational database 227 to obtain the explain plan of the relational database instruction to be validated as a plan tree structure.

The database system 200 may include a module 211 to generate the simulated user input 212 and provide the input 212 to the relational database instruction identification module 225. In some examples, the module 211 may include a module to run an f-test to generate the simulated user input 212 and a module to provide the input 212 to the module 225.

Figure 3:
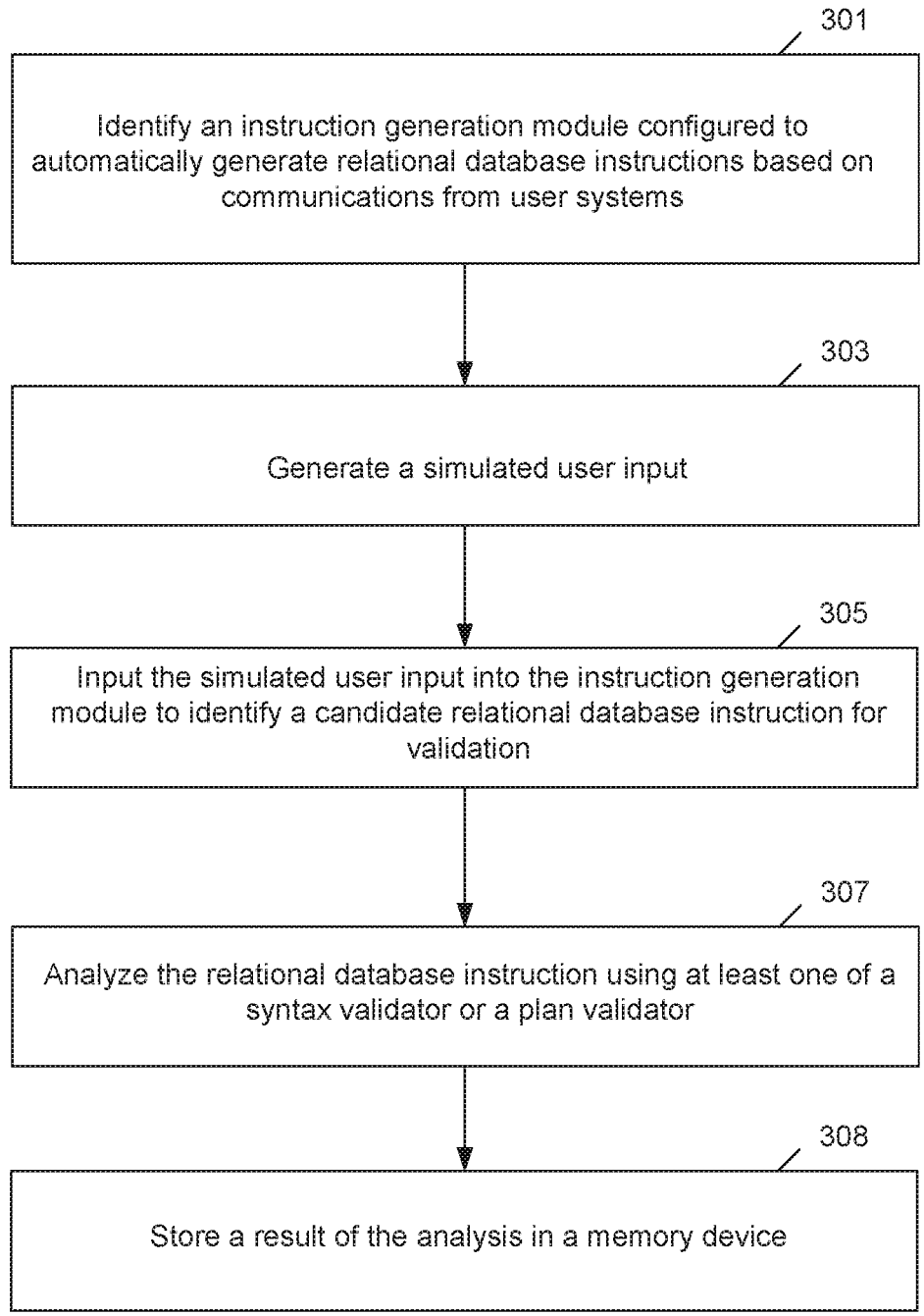
FIG. 3 illustrates a process that may be performed by the database system of FIG. 2, in some embodiments.

FIG. 3 illustrates a process that may be performed by the database system 200 of FIG. 2, in some embodiments. In block 301, the database system 200 may identify an instruction generation module configured to automatically generate relational database instructions based on communications from users systems. This may be a candidate instruction generation module for production release, for example.

In block 303, the database system 200 may generate a simulated user input. In block 305, the database system 200 may input the simulated user input into the instruction generation module to identify a candidate relational database instruction for validation.

In block 307, the database system may analyze the relational database instruction using at least one of a syntax validator or a plan validator. The syntax validator may also be referred to herein as a parser-based validator and may be configured to use any of the syntax and/or parsing-based validation techniques described herein. A syntax validator may be configured to parse text of a relational database instruction into a parse tree and identify elements, e.g., predefined elements, in the parse tree such as tables, columns in filters, columns in join conditions, hints, or the like, or combinations thereof. The syntax validator may be configured to use a rule-based validation checking responsive to identification of the elements and with respect to the identified elements. In some examples, the rule based validation may be to meet requirements of the database system (e.g., requirements of the database engine and/or the application server), and may include leading index checking, index hint checking, table hint checking, or the like, or combinations thereof.

A plan validator may be configured to use any of the plan validation techniques described herein. A plan validator may be configured to interact with a database engine and/or check an execution plan of the relational database instruction. Some plan validators may be to exchange communications with the database engine to obtain an explain plan of the input relational database instruction as a plan tree structure including nodes. The plan validator may traverse the tree structure to determine whether the relational database instruction conforms to predetermined conditions.

In some examples, the plan validator determines whether the tree structure is associated with predetermined table operations, such as FullScan, FullIndexScan, NestedLoop-Join, HashJoin, or the like, or combinations thereof. Some plan validators may then check whether the table operations corresponds to any of predetermined tables and/or correspond to a table having a predetermined table attributes (e.g., a threshold size, a threshold quantity of tables, or the like, or combinations thereof).

Some plan validators may include (or receive information from) a tree transformer module that is configured to parse the relational database instruction into a parse tree to extract transformation information such as filter columns, join columns, table identities (such as table names, table alias, etc.), or the like, or combinations thereof, in order to identify the nodes. The extracted transformation may be to be used by the validators, e.g., by the plan validators and/or the syntax validators.

A plan validator used in the analysis in block 307 may include any number of plan validators. Different plan validators may analyze different table operations of the relational database instruction. For instance, one plan validator may be configured to ascertain whether the relational database instruction includes a nested loop table operation, and responsive to a result of the ascertainment, identify whether the relational database instruction includes a valid index for columns of a join of the nested loop table operation. Another plan validator may be configured to ascertain whether the relational database instruction includes a hash join table operation, and responsive to a result of the ascertainment, identify whether the hash join table operation includes a filter. Another plan validator may be configured to ascertain whether the relational database instruction includes at least one of a semi-join table operation or an anti-join table operation, and response to a result of the ascertainment, identify whether a table operation type indicated by a plan tree node corresponds to a table operation type indication by a join hint of the relational database instruction.

In block 208, the database system 200 may store a result of the analysis in a memory device. In some examples, the result of the analysis may be used to automatically or manually identify and/or address performance issues with the database system to avoid those performance issues impacting users (e.g., customers).

Figure 4:
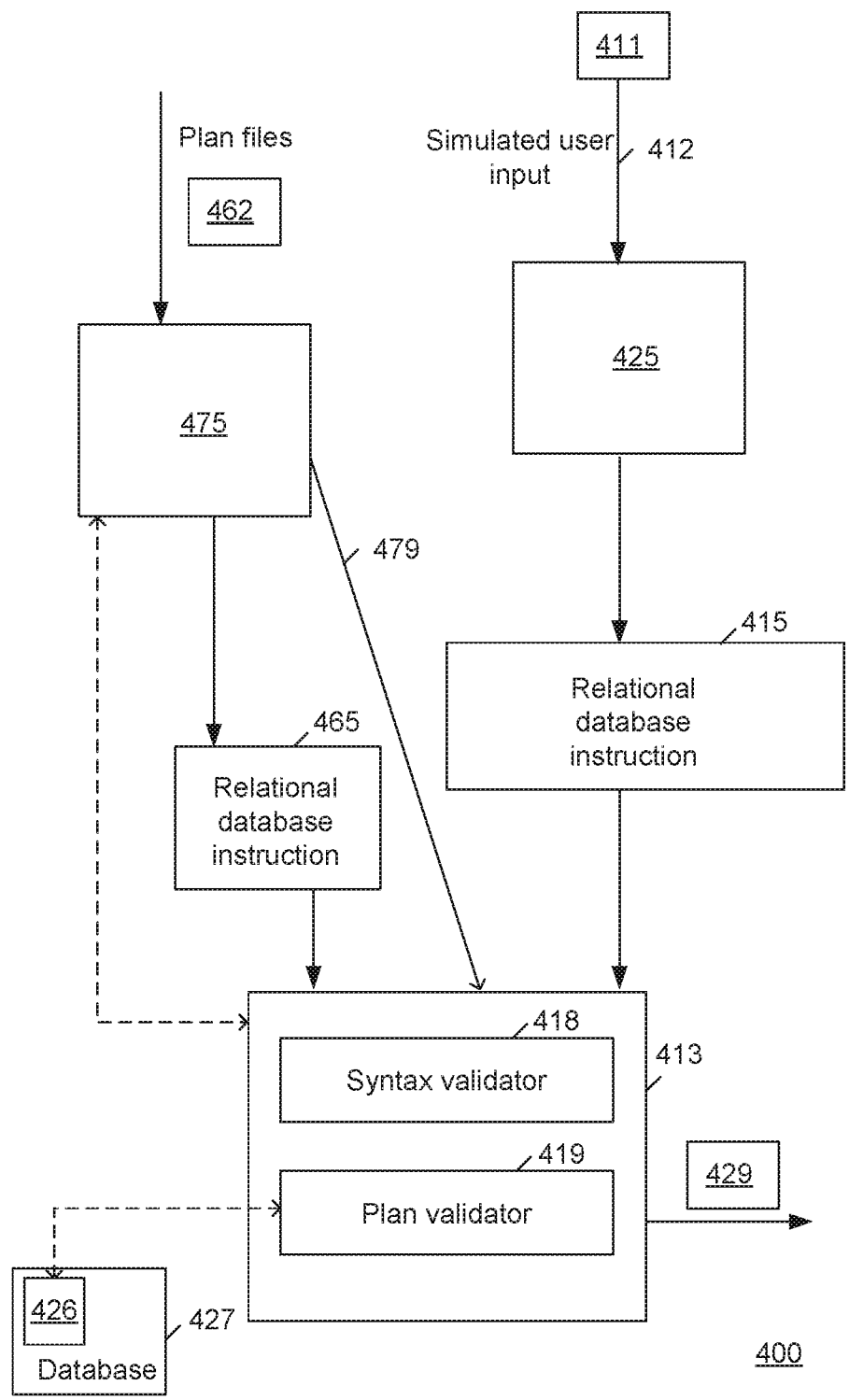
FIG. 4 illustrates another database system for relational database instruction validation.

FIG. 4 illustrates another database system 400 for relational database instruction validation. The database system 400 may include a transformation module 475 to identify a candidate relational database instruction 465 from a plan file 462 (such as a PL/SQL file). The transformation module 475 may also be configured to obtain transformation information 479 from the candidate relational database instruction 465 and/or the plan file (which may be a result of processing a parse tree), and provide the transformation information 479 to the validation module 413. The validation module 413 may be similar to the validation module 213 (and the validators 418 and 419 may be similar to the validators 218 and 219), and may be configured to generate validation indications 429 based on the candidate relational database instruction 415. As such, in some embodiments, a same validation component that is utilized for a candidate relational database instruction 415 (which is similar to the instruction 215 from FIG. 2) can be utilized for validation of the candidate relational database instruction 465. In some examples, a database system may include modules 475 and 465, but may not include module 411.

The database 427 and the database engine 426 may be similar to the relational database 227 (FIG. 2) and the database engine 226 (FIG. 2), respectively. The module 425 may be similar to the module 225 (FIG. 2). The module 411 and the simulated user input 412 may be similar to the module 211 (FIG. 2) and the simulated user input 212 (FIG. 2), respectively.

Figure 5:
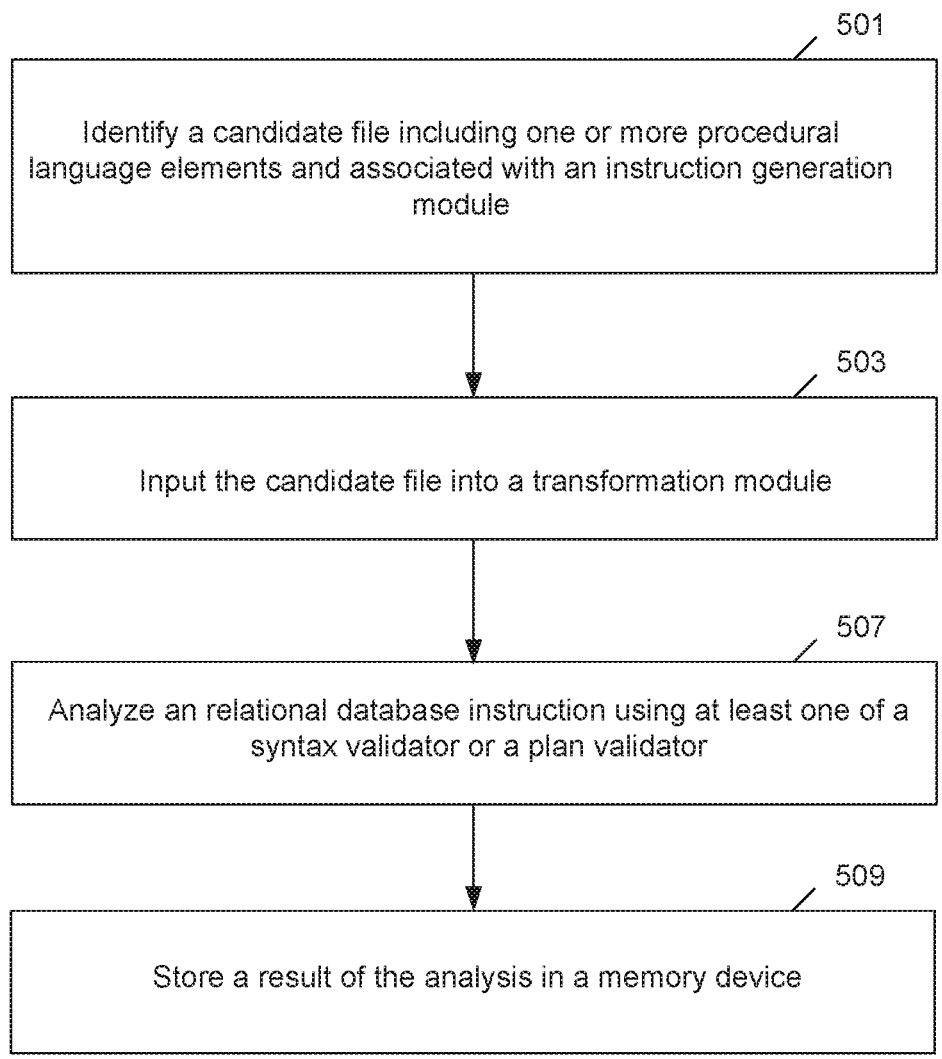
FIG. 5 illustrates a process that may be performed by the database system of FIG. 4, in some embodiments.

FIG. 5 illustrates a process that may be performed by the database system 400 of FIG. 4, in some embodiments. In block 501, the database system 400 may identify a candidate file including one or more procedural language elements and associated with an instruction generation module, such as a module configured to automatically generate relational database instructions based on communications from user systems. In some examples, this may be a candidate PL/SQL file or other plan file to be utilized by the database system 400 in production, for example.

In block 503, the database system 400 may input the candidate plan file into a transformation module. The transformation module may be configured to parse a transaction identified by the candidate plan file into one or more relational database instructions (e.g., to generate transformation information and/or to identify a subset of relational database instructions associated with the candidate plan file). The database system 400 may obtain a candidate relational database instruction and/or transformation information usable by a plan validator to validate the candidate relational database instruction responsive to inputting the candidate plan file into the transformation module.

In some examples, the candidate plan file may be a PL/SQL file or some other file based on an enhanced relational database instruction language, e.g., a relational database instruction file based on a procedural language. The candidate plan file may include more than one SQL statement, and the transformation information may identify a subset of these SQL statements. The transformation information may instruct a database engine how to obtain an explain plan for the associated relational database instruction (which again may be a subset of all relational database instructions associated with the plan file, in some embodiments).

In block 507, the database system 400 may analyze the relational database instruction using at least one of a syntax validator or a plan validator, which may be similar to the validators described in block 307 (FIG. 3) and/or may operate according to any validator described herein. At least some of the validators (such as a plan validator) may utilize the transformation information from the transformation module in block 507. In block 509, the database system 400 may store a result of the analysis in a memory device, which may be similar to block 308 (FIG. 3).

III. Identifying Additional Relational Database Instructions from System Views

Figure 6:
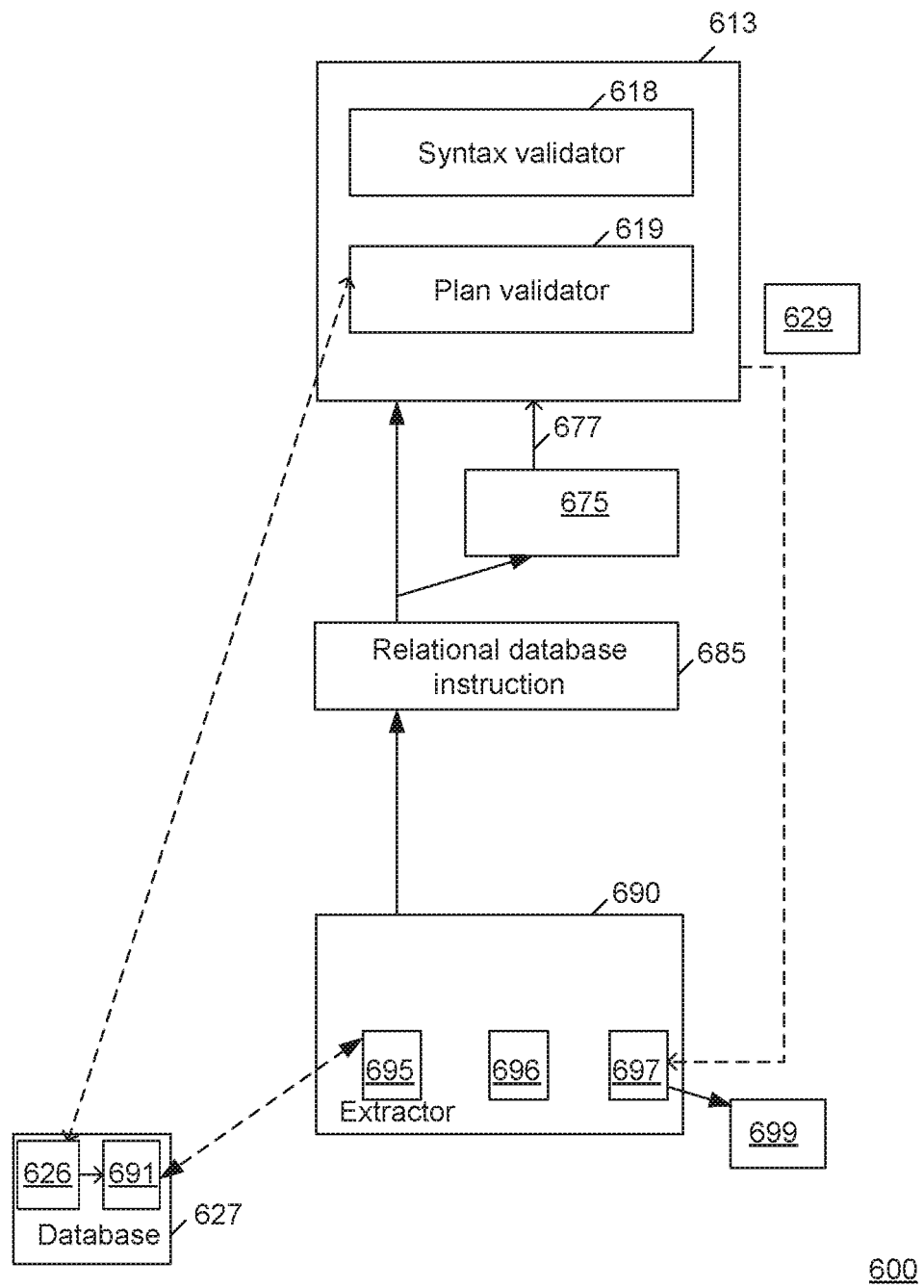
FIG. 6 illustrates yet another database system for relational database instruction validation.

FIG. 6 illustrates yet another database system 600 for relational database instruction validation. The database system 600 may include a production run module 690 to operate during production to identify relational database instructions from system views 691 generated from database engine 626 of relational database 627 (database engine 626 and database 627 may be similar to database engine 226 (FIG. 2) and relational database 227 (FIG. 2), respectively). The production run module 690 may be configured to provide a relational database instruction 685 to a validation module 613, which be similar to validation module 213 (FIG. 2) and may include validators 618 and 619 that may similar to validators 218 and 219 (FIG. 2), respectively. The production run module 690 may be implemented as a background job (e.g., a Cron job based on Cron Expressions, which may indicate intervals for executing predetermined processes) of database system 24 (FIG. 1B) in some examples.

The production run module 690 may include an extractor module 695 to exchange communications with the database 627 at scheduled times (e.g., periodically in some examples) to obtain the system views 691. The extractor module 695 may be configured to identify relational database instructions from the obtained system views.

The production run module 690 may include a duplicate detector module 696. The duplicate detector module 696 may include a memory device to store information about received system views and/or the identified relational database instructions. The duplicate detector module 696 may be configured to determine whether a newly identified relational database instruction is the same as a previously identified relational database instruction, so that validation may be skipped for duplicates.

The production run module 690 may include a logging and/or monitoring module 697 to generate data 699 (which may include log data) based on the validation indications 629. The data 699 may include raw data and metrics or other data based on the raw data.

In some examples, a same validation module 613 used to validate candidate relational database instruction 685 during production can be used for candidate relational database instruction(s) similar to instructions 215 (FIG. 2) and/or instruction 415 (FIG. 4) prior to production. In some examples, a same transformation module may also be used. For instance, the transformation module 675 may be similar to the transformation module 475 (FIG. 4), and the transformation information 677 may be similar to transformation information 470 (FIG. 4).

Figure 7:
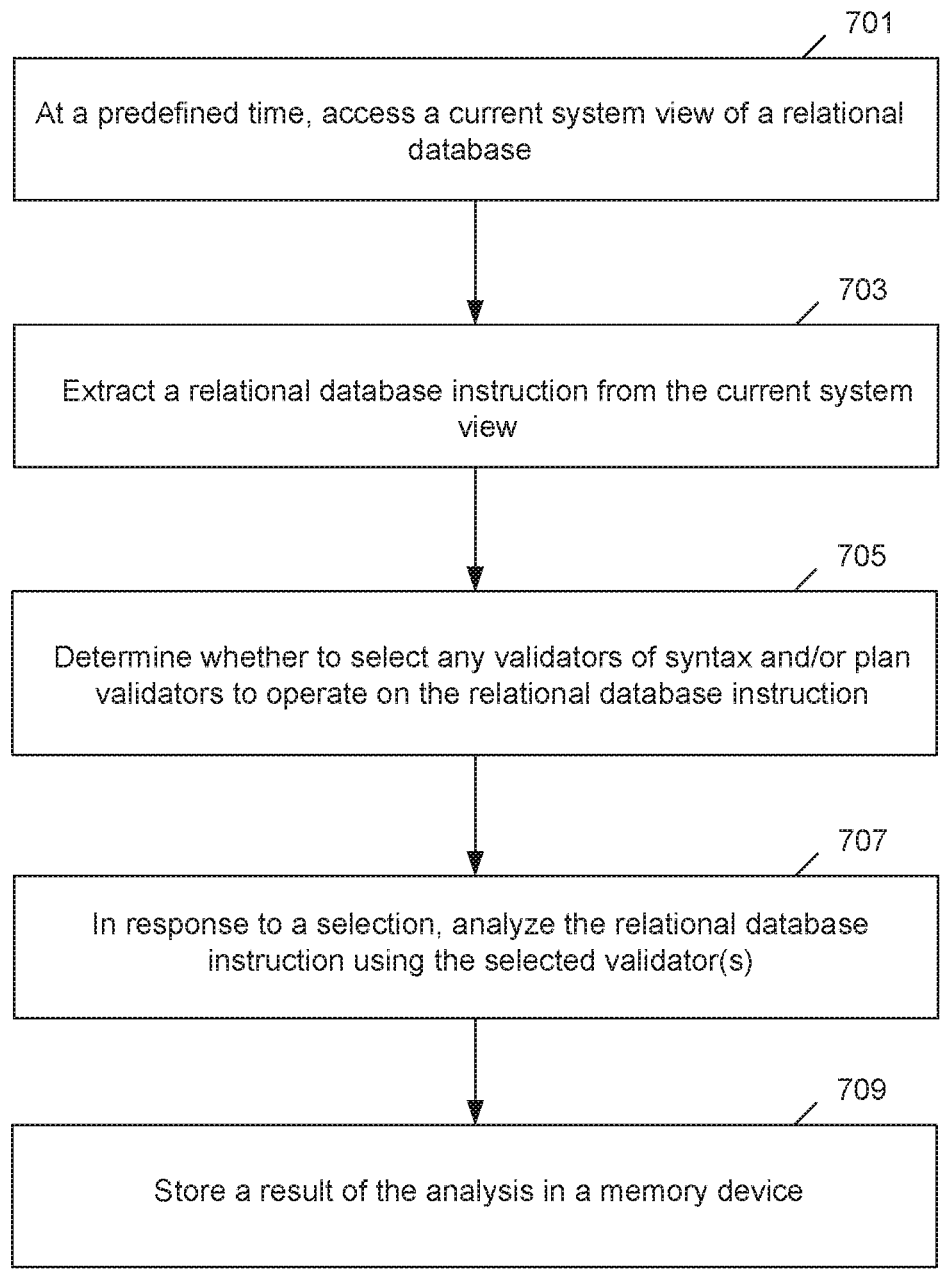
FIG. 7 illustrates a process that may be performed by the database system of FIG. 6, in some embodiments.

FIG. 7 illustrates a process that may be performed by the database system 600 of FIG. 6, in some embodiments. In block 701, at a predefined time the database system 600 may access a current system view of a relational database. In block 703, the database system 600 may extract a relational database instruction from the current system view.

In block 705, the database system 600 may determine whether to select any validators of syntax and/or plan validators to operate on the relational database instruction. In some examples, information about previously accessed system views and/or the relational database instructions extracted therefrom may be stored. Current information about the current system view may be compared to the stored information to determine whether the extracted relational database instruction is a duplicate. The database system 600 may determine to bypass validation for a duplicate.

The database system 600 may select some or all of the validators to be used for validating a non-duplicate. In some examples, the database system 600 may select a subset of the validators (e.g., plan validators) conditionally based on a current condition associated with the database system 600 (a plan validator may exchange communications with a database engine, which can affect performance of the database engine). For instance, if a current time corresponds to peak hours of customer use of the database system 600, the database system 600 may not select plan validators (which may communicate with the database engine 626). In some examples, a backlog may be generated to utilize a plan validator during off-peak hours on a relational database instruction identified from a system view access during on-peak hours.

In some examples, the database system 600 may determine whether the extracted relational database instruction corresponds to any relational database instructions of any previously accessed system views of the relational database. The database system 600 may analyze the extracted relational database instruction using at least one validator of more than one validator based on a result of the determination. The more than one validator may include at least one of a syntax validator or a plan validator.

In some examples, the database system 600 may identify at least one of a current time or a parameter indicative of a current utilization of a database engine of the relational database. The database system 600 may select a subset of the validators to be used for validation responsive to the current time or the parameter, wherein the at least one validator includes each validator of the selected subset.

In some examples, the system views may be generated by a database engine of the relational database based on receipt of automatically generated relational database instructions and/or may be generated at times based on a current state of the relational database at those times. These instructions may include SQL statements generated by an application server of the database system 600.

In block 707, the database system 600 may, in response to a selection, analyze the relational database instruction using the selected validator(s). In block 709, the database system may store a result of the analysis, which may be similar to block 308 (FIG. 3). In some examples, in block 707 the database 600 may generate log data based on a result of the analysis and may store the log data or data derived therefrom in a metrics data store. In some examples, the database system 600 may provide the result of the analysis to a metric generation module to generate metric data based on raw data of the result of the analysis and/or provide the result of the analysis to a logging module to generate log data responsive to the result of the analysis.

In some examples, the database system 600 may periodically access system view data of a relational database of the database system. The database system 600 may extract relational database instructions from the system view data, and analyze at least some of extracted relational database instructions using a syntax validator and/or a plan validator.

In some examples, the database system 600 may determine whether a most recently extracted relational database instruction corresponds to any previously extracted relational database instructions, and bypass inputting of the most recently extracted relational database instruction into the validators based on a result of the determination.

In some examples, the database system 600 may input a first relational database instruction of the relational database instructions into a first set of the validators, and may input a second different relational database instruction of the relational database instructions into a second different set of the validators. One of the sets of the validators may be a superset with respect to the other set of the validators.

In some examples, the database system 600 may bypass or delay inputting of a selected relational database instruction of the relational database instructions into only a subset of the validators based on at least one of a time of day or a parameter indicative of a utilization of the database engine at a time corresponding to extraction of said selected relational database instruction. In one example, a selected relational database instruction may be input into only validators that do not exchange communications with the database engine (e.g., syntax validators); while other relational database instructions may be input into those validators and other validators.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a database system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system, comprising:
   a processing system; and
   a memory device coupled to the processing system and including instructions stored thereon that, in response to execution by the processing system, are operable to:
   identify an instruction generation module configured to automatically generate relational database instructions based on communications from user systems;
   generate a simulated user input to feed into the instruction generation module to identify a relational database instruction based on the simulated user input to obtain a candidate relational database instruction to be input into a validation module,
   wherein the validation module includes validators including one or more parser based validators that are configured to parse structured query language text into a parse tree to identify elements and one or more rule-based validators including at least one of a syntax validator or a plan validator, and wherein at least one of the one or more parser based validators is configured to use at least one of the one or more rule based validators;
   select a subset of the validators of the validation module for a given obtained candidate relational database instruction, and provide that instruction to the selected validators;
   identify a plan file including one or more procedural language elements to be accessed by the database system during operation of the instruction generation module;
   identify a relational database instruction corresponding to the plan file; and
   analyze the relational database instruction that corresponds to the plan file using selected validator(s) of the one or more rule-based validators;
   validate the candidate relational database instruction based on the simulated user input using the at least one parser based validator, wherein a validation using the at least one parser based validator is based on a result of applying predefined rules corresponding to the at least one rule based validator; and
   output an indication based on whether an error and/or performance issue is detected based on a result of the validation and automatically file a bug report with detailed reasoning about the error and/or performance issue.

2. The database system of claim 1, wherein the plan validator is configured to ascertain whether the relational database instruction corresponding to the plan file includes a predefined table operation to operate on a predefined table type or a table having an attribute corresponding to a predefined attribute.

3. The database system of claim 2, wherein the predefined table operation comprises at least one of full scan or full index scan.

4. The database system of claim 2, wherein the predefined table type comprises tables larger than a threshold size.

5. The database system of claim 1, wherein the plan validator is configured to:
   ascertain whether the relational database instruction corresponding to the plan file includes a nested loop table operation; and
   in the case that the relational database instruction corresponding to the plan file does include the nested loop operation, identify whether the relational database instruction corresponding to the plan file includes a valid index for columns of a join of the nested loop table operation.

6. The database system of claim 1, wherein the plan validator is configured to:
   ascertain whether the relational database instruction corresponding to the plan file includes a hash join table operation; and
   in the case that the relational database instruction corresponding to the plan file does include the hash join table operation, identify whether the hash join table operation includes a filter.

7. The database system of claim 1, wherein the plan validator is configured to:
  ascertain whether the relational database instruction corresponding to the plan file includes at least one of a semi-join table operation or an anti-join table operation; and
  in the case that the relational database instruction corresponding to the plan file does include the semi-join table operation or the anti-join table operation, identify whether a table operation type indicated by a plan tree node corresponds to a table operation type indicated by a join hint of the relational database instruction corresponding to the plan file.

8. The database system of claim 1, wherein the at least one parser based validator is configured to:
  parse a target relational database instruction into a parse tree, wherein the parse tree includes elements comprising at least one of tables, columns in filters, columns in join conditions, or a relational database instruction hint;
  identify an element of the elements of the parse tree; and
  apply a corresponding predefined rule of the predefined rules to the identified element.

9. The database system of claim 1, wherein the plan validator comprises an explain plan validator configured to obtain an explain plan from a database engine of a relational database.

10. The database system of claim 9, wherein the explain plan includes a plan tree structure including a plurality of nodes.

11. The database system of claim 1, wherein the plan validator is configured to:
  compare table operations of a plurality of nodes of a plan tree structure obtained from a relational database to a list of predefined table operations;
  apply a corresponding predefined rule of the predefined rules responsive to a result of the comparison.

12. The database system of claim 1, wherein the database system is further configured to:
  parse the relational database instruction corresponding to the plan file into a parse tree; and
  extract, from the parse tree, transformation information to be used by the one or more rule-based validators.

13. The database system of claim 12, wherein the transformation information includes at least one of filter columns, join columns, or table identities.

14. The database system of claim 13, wherein the table identities comprise table names or table aliases.

15. A method, comprising:
  identifying an instruction generation module configured to automatically generate relational database instructions based on communications from one or more user systems;
  generating a simulated user input to feed into the instruction generation module to identify a relational database instruction based on the simulated user input to obtain a candidate relational database instruction to be input into a validation module,
  wherein the validation module includes validators including one or more parser based validators that are configured to parse structured query language text into a parse tree to identify elements and one or more rule-based validators including at least one of a syntax validator or a plan validator, and wherein at least one of the one or more parser based validators is configured to use at least one of the one or more rule based validators;
  selecting a subset of the validators of the validation module for a given obtained candidate relational database instruction, and providing that instruction to the selected validators;
  identifying a plan file including one or more procedural language elements to be accessed by a database system during operation of the instruction generation module;
  identifying a relational database instruction corresponding to the plan file; and
  analyzing the relational database instruction that corresponds to the plan file using selected validator(s) of the one or more rule-based validators;
  validating the candidate relational database instruction based on the simulated user input using the at least one parser based validator, wherein a validation using the at least one parser based validator is based on a result of applying predefined rules corresponding to the at least one rule based validator; and
  outputting an indication based on whether an error and/or performance issue is detected based on a result of the validation and automatically filing a bug report with detailed reasoning about the error and/or performance issue.

16. The method of claim 15, wherein the plan validator is configured to ascertain whether the relational database instruction corresponding to the plan file includes a predefined table operation to operate on a predefined table type or a table having an attribute corresponding to a predefined attribute.

17. The method of claim 15, further comprising:
  parsing the relational database instruction corresponding to the plan file into a parse tree; and
  extracting, from the parse tree, transformation information to be used by the one or more rule-based validators.

18. The method of claim 17, wherein the transformation information includes at least one of filter columns, join columns, or table identities.

19. The method of claim 15, wherein the at least one parser based validator is configured to:
  parse a target relational database instruction into a parse tree, wherein the parse tree includes elements comprising at least one of tables, columns in filters, columns in join conditions, or a relational database instruction hint;
  identify an element of the elements of the parse tree; and
  apply a corresponding predefined rule of the predefined rules to the identified element.

20. The method of claim 15, wherein the plan validator is configured to:
  compare table operations of a plurality of nodes of a plan tree structure obtained from a relational database to a list of predefined table operations;
  apply a corresponding predefined rule of the predefined rules responsive to a result of the comparison.

* * * * *